July 12, 1955
G. H. FIGGINS
2,712,808
PNEUMATIC TIRE DEFLATION SIGNALING DEVICE
Filed Nov. 30, 1953
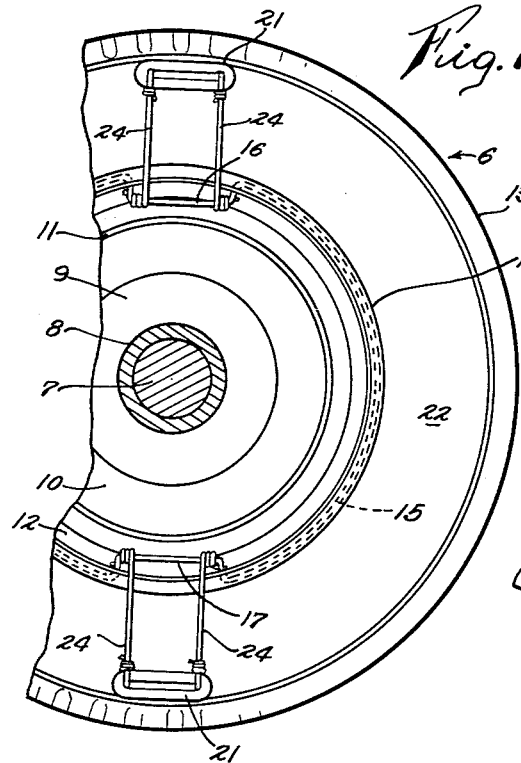
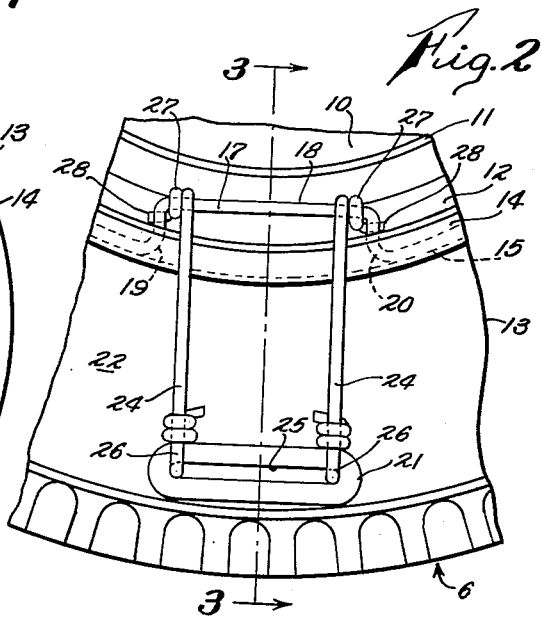
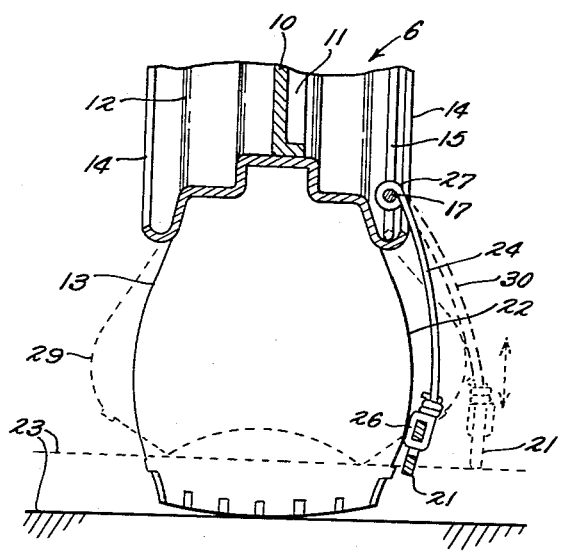
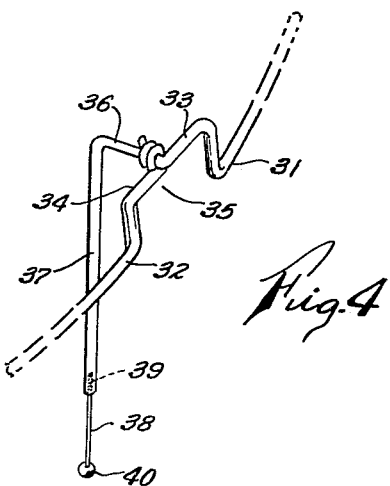
INVENTOR.
George H. Figgins
BY
Murray, Sackhoff & Murray
ATT'YS

United States Patent Office 2,712,808
Patented July 12, 1955

2,712,808

PNEUMATIC TIRE DEFLATION SIGNALING DEVICE

George H. Figgins, Hamilton, Ohio

Application November 30, 1953, Serial No. 395,110

7 Claims. (Cl. 116—34)

The present invention relates to an improved pneumatic tire deflation signaling device and is particularly directed to a device that will audibly signal the operator of a moving vehicle when a tire on the vehicle wheel equipped with said device becomes deflated below a predetermined pressure.

According to my invention a snap ring is mounted within the inturned, peripheral flange of a vehicle wheel, said ring having oppositely radiating arms projecting therefrom in spaced lateral relationship with respect to the side wall of the pneumatic tire on the rim, the end of each arm positioning a flexible road contacting element inwardly away from the roadway when the tire is in fully inflated condition such that its ends will whip against the roadway when the tire is underinflated to give an audible signal.

In a more limited sense my invention consists of a roadway contacting element located against a side wall of the pneumatic tire in a position spaced inwardly away from the roadway when the tire is fully inflated; said element being mounted on the vehicle wheel rim by a simplified arrangement that permits lateral movement of the weigth to a radially reciprocating position as the tire becomes deflated, to allow the weight to intermittently come in contact with the roadway during rotation of the wheel and thus give an audible signal to the vehicle operator of the deflated condition of said tire.

An object of the invention is to provide a device of the foregoing character which is relatively inexpensive and which may be readily attached to the vehicle wheel that is to be protected by the signaling device.

Another object of the invention is to provide a signaling device that will positively give an audible alarm to a vehicle operator when the pressure in the tire guarded thereby falls below a predetermined value.

With the foregoing general objects in view the invention will now be described in detail, reference being had to the accompanying drawings, wherein:

Fig. 1 is a fragmental, elevational view of the inside face of a vehicle wheel showing my improved signaling device attached thereto.

Fig. 2 is an enlarged elevational view showing a portion of my signaling device in detail.

Fig. 3 is a section taken on line 3—3 of Fig. 2, the deflated condition of the tire and the corresponding position of my signaling device being shown in dotted lines therein.

Fig. 4 is a fragmental perspective view of a modified form of my signaling device.

Referring now to Fig. 1 of the drawings there is depicted the inside face of a rear wheel 6 for a vehicle such as a passenger automobile. In said figure the numeral 7 indicates a drive shaft enclosed in a housing 8, the latter of which has fixed to its end portion a brake drum housing 9. The wheel spider or disc 10 is detachably mounted on the hub (not shown) of the axle 7 by the usual lugs, whilst the spider or disc may have a peripheral flange 11 secured by welding, or the like, to a rim 12. This rim has the usual cross sectional form illustrated in Fig. 3 of the drawing and mounts a conventional pneumatic tire 13 in a well known manner. As best shown in Fig. 3 the rim has a half round, inwardly facing flange 14—14 extending laterally from each side of its periphery.

The vehicle wheel to which my tire deflation signaling device is to be applied may have other constructions than that shown in the drawings so long as the wheel is provided with at least one inwardly facing and laterally extending peripheral flange. My device may be applied to either face of a vehicle wheel, but is ideally suited for mounting on the inside face where it cannot be visibly detected from the exterior side of a vehicle equipped with my devices.

The tire deflation signaling device of this invention comprises a wheel mounting means illustrated in the drawings as a snap ring 15 preferably made of standard No. 9 wire stock, said ring having an outside diameter that will securely seat it within the half round, peripheral flange 14 on the rim 12. The snap ring is shaped with at least two oppositely located inset portions 16 and 17, each of said inset portions having a straight section 18 normal to a diameter of the ring running through the center of said section. The straight section is joined at its ends to the ring by reverse bend portions 19 and 20.

A roadway contacting element, such as a weight 21, is normally located against a side wall 22 of the pneumatic tire in a position radially outwardly from each inset portion 16—17. This contacting element normally is spaced inwardly away from the roadway 23 when the tire 13 is fully inflated by means of a laterally flexible connection with the wheel mounting means.

The laterally flexible connection for each weight preferably comprises a pair of weight positioning arms 24—24 made of spring steel. Each arm is connected at its outer end to tangentially spaced apart portions of its respective weight. To this end the weight may have an elongated slot 25 formed centrally therein and the outer end of each arm looped through an end of the slot as at 26, the terminal ends of the arms being twisted around an intermediate portion to provide a good connection between the arms and the weight. The inner end of each arm is coiled at 27 around the respective end portion of the straight section 18, the stub end 28 of the coil being hooked around the respective return bend portion 19—20 to hold the associated coil under tension and urge its arm and the associated weight against the side wall 22.

With particular reference to Fig. 3 the full lines illustrate the normal position of my device on a tire protected thereby. If for any reason the pneumatic pressure of the tire should fall below its fully inflated condition, during operation of the vehicle, the bottom portion of the tire will assume the deflated form shown by the dotted lines 29 in said figure. This condition will cause the weight carrying arms 24—24 to intermittently flex outwardly with the adjacent tire portion and to periodically assume the dotted line position 30. In said position the outer tip of the weight will forceably come in contact with the surface of the roadway thereby making a clicking noise that will be audible to the driver of the vehicle to warn him that the protected tire is in a deflated condition. It will be noted that in its outer flexed condition the weights are free to reciprocate radially due to the angularity of the weight carrying arms with respect to the snap mounting ring, thus precluding the possibility of dislodging the ring from the rim when the weights contact the roadway.

In Fig. 4 of the drawings there is shown a modified form of my invention wherein the wheel mounting means is a snap ring formed from two half sections 31 and 32, each formed at their ends with complementary return bend portions 33 and 34 which form ring inset portions 35. The terminal end of the half section 32 may be twisted around a laterally extending portion 36 on the end of section 31 to form the closed snap ring. The end of the portion 36 is connected to a radially extended arm 37 spaced laterally away from the side wall of a tire to be protected with the device a distance substantially that of the length of the portion 36. The end of said arm 37 is secured to a flexible road contacting finger 38 preferably made of spring steel wire stock. The finger may be secured to the end of the arm 37 by forming a tapped bore 39 in the arm and threading the upper end of the finger thereinto. The lower end of the finger has a round weight 40 secured to it in any suitable manner, it being understood that the weight is positioned radially inwardly from the roadway when the tire is fully inflated. This modification functions in the same way as the preferred embodiment of my device, it being understood that the weight 40 on the finger will come in contact with the roadway surface and give a warning noise only when the guarded tire is in a deflated condition.

What is claimed is:

1. The combination with a vehicle wheel having a pneumatic tire mounting rim with an inwardly directed, laterally extending peripheral flange, of a resilient snap ring seated within the confines of the rim flange, oppositely located inset portions formed in the snap ring, a roadway contacting element located beside a side wall of the tire in a position radially outwardly from each inset portion in the snap ring the outer extremity of said element being normally spaced inwardly away from the roadway when the tire is fully inflated, and each element having a flexible connection with the adjacent inset portion in the snap ring.

2. The combination with a vehicle wheel having a pneumatic tire mounting rim with an inwardly directed, laterally extending peripheral flange, of a resilient snap ring seated within the confines of the rim flange, oppositely located inset portions formed in the snap ring, a roadway contacting element located beside a side wall of the tire in a position radially outwardly from each inset portion in the snap ring, the outer extremity of said element being normally spaced inwardly away from the roadway when the tire is fully inflated, and a flexible connection between the element and its adjacent inset portion in the snap ring.

3. A pneumatic tire deflation signaling device for mounting on the rim of a vehicle wheel that has an inwardly facing and laterally extending peripheral flange, a snap ring secured within the flange and having at least two oppositely located inset portions formed therein, a roadway contacting element positioned beside a side wall of the tire and disposed radially outwardly from each inset portion of the ring, an arm fixed to each inset portion and having its outer end secured to the respective element to normally hold said element a spaced distance from the roadway when the tire is fully inflated and permit the element to contact the road when the tire is in an underinflated condition.

4. A pneumatic tire deflation signaling device for mounting on the rim of a vehicle wheel that has an inwardly facing and laterally extending peripheral flange, a snap ring secured within the flange and having at least two oppositely located inset portions formed thereon, a weight positioned against a side wall of the tire in spaced relationship with the roadway when the tire is fully inflated, said weight being disposed radially outwardly from each inset portion, a weight positioning arm formed of spring steel connected at its outer end to each weight, a coil section formed on the inner end portion of each arm and each encircling the respective inset portion, and a stub end on each coil for engaging an adjacent portion of the ring to hold the associated coil under tension and urge the arm and associated weight against the side wall of the tire.

5. A pneumatic tire deflation signaling device for mounting on a tire rim that has an inwardly facing and laterally extending peripheral flange, a snap ring secured within the rim flange and having at least two, oppositely located inset portions formed thereon, a weight positioned against a side wall of the tire and disposed radially outwardly from each inset portion, a pair of weight positioning arms formed of spring steel connected at their outer ends to tangentially spaced apart portions of each weight, a coil section formed on the inner end portion of each arm and each encircling a tangentially spaced apart portion of the inset portion, and a stub end on each coil for engaging an adjacent portion of the ring to hold the associated arm and the coil under tension and urge its associated weight against the side wall of the tire.

6. A pneumatic tire deflation signaling device for mounting on the rim of a vehicle wheel that has an inwardly facing and laterally extending peripheral flange, a snap ring secured within the rim flange and having at least two oppositely located inset portions formed thereon, an arm secured to each inset portion and extending radially outwardly therefrom in lateral spaced relationship to the side wall of the tire, and a flexible road contacting element on the outer end of each arm, the outer end of each element being spaced inwardly from the roadway when the tire is in fully inflated condition and adapted to contact the roadway when the tire becomes underinflated.

7. A pneumatic tire deflation signaling device for mounting on the rim of a vehicle wheel that has an inwardly facing and laterally extending peripheral flange, a snap ring secured within the rim flange and having at least two oppositely located inset portions formed thereon, an arm secured to each inset portion and extending radially outwardly therefrom in lateral spaced relationship to the side wall of the tire, a road contacting element located outwardly from each arm, and a flexible finger secured to the element and connected to the end of its respective arm, to normally hold the element in a position spaced inwardly away from the roadway when the tire is in fully inflated condition.

References Cited in the file of this patent

UNITED STATES PATENTS

| | | |
|---|---|---|
| 1,358,156 | Jansen | Nov. 9, 1920 |
| 1,447,594 | Martin | Mar. 6, 1923 |

FOREIGN PATENTS

| | | |
|---|---|---|
| 448,013 | France | Nov. 14, 1912 |